United States Patent
Kawata et al.

(10) Patent No.: US 8,390,856 B2
(45) Date of Patent: Mar. 5, 2013

(54) IMAGE FORMING APPARATUS, COMMUNICATION DEVICE, COMPUTER READABLE MEDIUM, AND COMMUNICATION METHOD

(75) Inventors: Yuichi Kawata, Kanagawa (JP); Masakazu Kawashita, Kanagawa (JP); Yoshifumi Bando, Kanagawa (JP); Keita Sakakura, Kanagawa (JP); Masahiko Kikuchi, Kanagawa (JP); Hiroaki Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 739 days.

(21) Appl. No.: 12/560,456

(22) Filed: Sep. 16, 2009

(65) Prior Publication Data
US 2010/0245893 A1 Sep. 30, 2010

(30) Foreign Application Priority Data

Mar. 24, 2009 (JP) ................................. 2009-072788

(51) Int. Cl.
*G06F 3/12* (2006.01)
*G06K 15/00* (2006.01)
*G06F 1/00* (2006.01)

(52) U.S. Cl. ..................... 358/1.15; 358/1.13; 358/1.14; 713/323; 713/324; 713/320; 713/310

(58) Field of Classification Search ........................ None
See application file for complete search history.

(56) References Cited

U.S. PATENT DOCUMENTS

| | | | |
|---|---|---|---|
| 7,555,662 B2 * | 6/2009 | Kidoguchi | 713/323 |
| 2002/0109857 A1 * | 8/2002 | Ueno et al. | 358/1.14 |
| 2006/0236143 A1 * | 10/2006 | Kidoguchi | 713/320 |
| 2008/0240740 A1 * | 10/2008 | Asano | 399/2 |
| 2009/0063883 A1 * | 3/2009 | Mori | 713/324 |
| 2011/0007901 A1 * | 1/2011 | Ikeda et al. | 380/270 |

FOREIGN PATENT DOCUMENTS

| | | |
|---|---|---|
| JP | 09-191315 A | 7/1997 |
| JP | 2001-257688 A | 9/2001 |
| JP | 2005-198090 A | 7/2005 |
| JP | 2006-259906 A | 9/2006 |
| JP | 2006-287299 A | 10/2006 |
| JP | 2009-023219 A | 2/2009 |
| JP | 2009-049699 A | 3/2009 |

OTHER PUBLICATIONS

Japanese Office Action issued in corresponding Japanese Patent Application No. 2009-072788; mailed Mar. 8, 2011.

* cited by examiner

*Primary Examiner* — Satwant Singh
(74) *Attorney, Agent, or Firm* — Sughrue Mion, PLLC

(57) ABSTRACT

An image forming apparatus includes: a communication unit that receives a request that requests a reply and includes a source of the request and a destination of the request; and a controller that returns from a low electric power condition after moving into the low electric power condition of which the power consumption is low, and that controls the communication unit, wherein when the controller is in the low electric power condition, the communication unit returns the reply to the request received and detects a duplication between an identification information that identifies the source and an identification information that identifies the destination based on the request.

6 Claims, 8 Drawing Sheets

CASE: DUPLICATION BETWEEN
IPs DOES NOT OCCUR

CASE: DUPLICATION BETWEEN
IPs OCCURS

CASE: DUPLICATION
BETWEEN IPs OCCURS

CASE: DUPLICATION
BETWEEN IPs OCCURS

IMAGE FORMING APPARATUS, COMMUNICATION DEVICE, COMPUTER READABLE MEDIUM, AND COMMUNICATION METHOD

CROSS-REFERENCE TO RELATED APPLICATION

This application is based on and claims priority under 35 USC 119 from Japanese Patent Application No. 2009-072788 filed Mar. 24, 2009.

BACKGROUND

1. Technical Field

This invention relates to an image forming apparatus, a communication device, a computer readable medium, and a communication method.

2. Related Art

There has been conventionally known a network device that can continue the sleep mode even when the network device receives an inquiry requesting a reply.

SUMMARY

According to an aspect of the present invention, there is provided an image forming apparatus including: a communication unit that receives a request that requests a reply and includes a source of the request and a destination of the request; and a controller that returns from a low electric power condition after moving into the low electric power condition of which the power consumption is low, and that controls the communication unit, wherein when the controller is in the low electric power condition, the communication unit returns the reply to the request received and detects a duplication between an identification information that identifies the source and an identification information that identifies the destination based on the request.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

First Embodiment

Figure 1A:
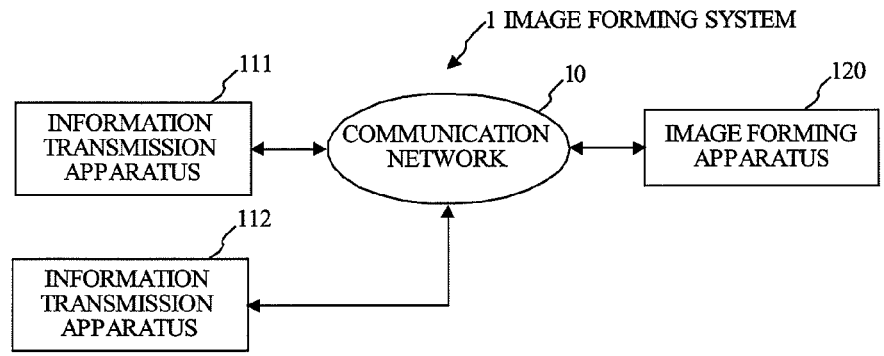
FIGS. 1A through 1C are configuration diagrams illustrating an exemplary embodiment of an image forming apparatus in accordance with an exemplary embodiment of the present invention.
Figure 1B:
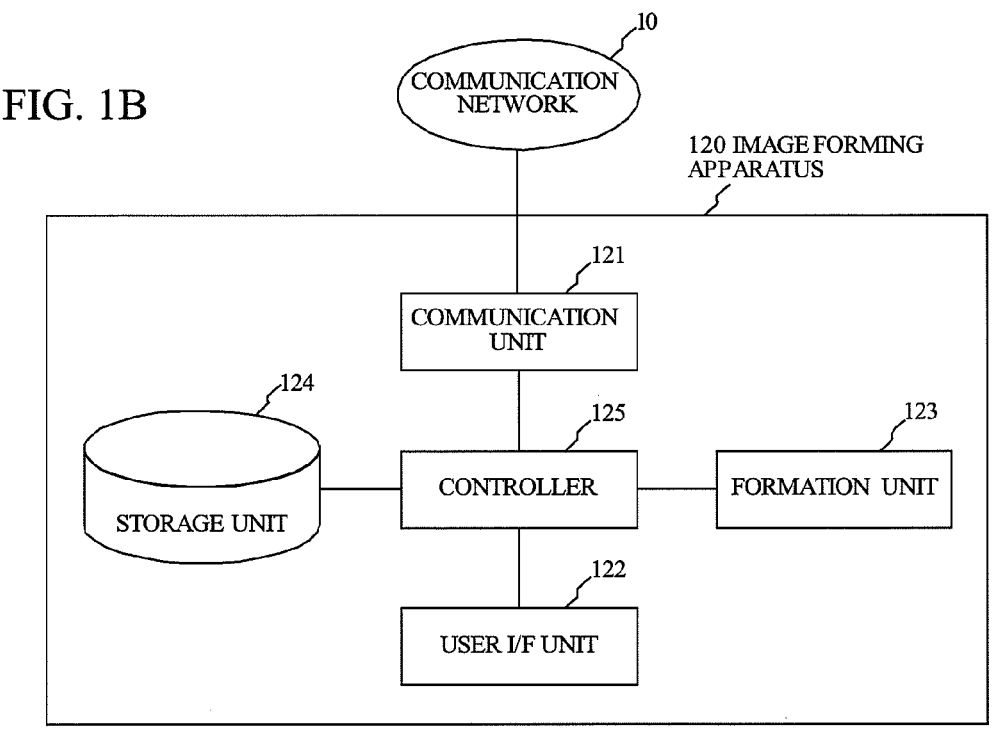
Figure 1C:
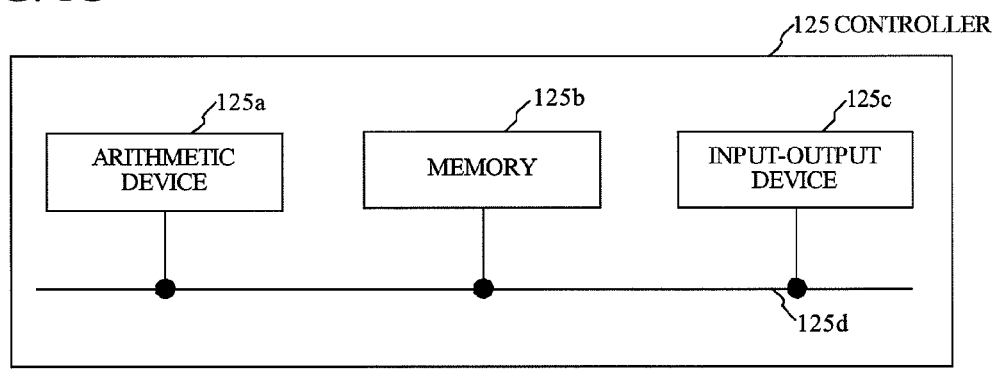

FIGS. 1A through 1C are configuration diagrams illustrating an exemplary embodiment of an image forming system containing an image forming apparatus in accordance with this present invention.

An image forming system 1 illustrated in FIG. 1A includes a communication network 10, information transmission apparatuses 111 and 112, and an image forming apparatus 120.

The communication network 10 is built with LAN (Local Area Network), WAN (Wide Area Network), MAN (Metropolitan Area Network), or a public line network for example. In this embodiment, the description will be given assuming that the communication network 10 is Ethernet (Registered Trade Mark). However, the communication network 10 is not limited to Ethernet (Registered Trade Mark).

Because the information transmission apparatuses 111 and 112 have almost same configurations each other, hereinafter the information transmission apparatus 111 will be described mainly. The information transmission apparatus 111 is configured with a personal computer for example. The information transmission apparatus 111 is operated by the user of the information transmission apparatus 111 and transmits the image information representing the image to the image forming apparatus 120. The information transmission apparatus 111 transmits a formation instruction, which instructs the receiver of the formation instruction to form the image represented by the image information that the information transmission apparatus 111 transmits, to the image forming apparatus 120. In this embodiment, because the image forming apparatus 120 forms images by printing, the formation instruction is also described as the print instruction.

The information transmission apparatus 111 transmits the reply request that requests a return with the predetermined reply to the information transmission apparatus 111, to an electronic apparatus communicating via the communication network 10. More specifically, the reply request includes the request that requests a return with the condition of the electronic apparatus of the electronic apparatus with which the information transmission apparatus 111 communicates. In this embodiment, the description will be given assuming that the condition of the electronic apparatus indicates the physical address set to the electronic apparatus. However, what the condition of the electronic apparatus indicates is not limited to this embodiment. The condition of the electronic apparatus can include the error information representing the trouble in the electronic apparatus for example. The condition of the electronic apparatus includes the information about the printing medium that the electronic apparatus uses for printing (paper information) when the electronic apparatus is the apparatus that prints images on the printing medium such as papers.

More specifically, the information transmission apparatus 111 broadcasts the ARP (Address Resolution Protocol) request packet to the communication network 10 as the reply request. Then, the information transmission apparatus 111 relates the replied physical address and the logical address of the electronic apparatus, and memorizes it. When the information transmission apparatus 111 transmits the image information or the print instruction to the image forming apparatus 120 designated by the logical address, the information transmission apparatus 111 communicates by using the physical address related to the logical address. In this embodiment, the description will be given assuming that the physical address includes MAC (Media Access Control address) and the logical address includes IP (Internet Protocol) address. However, the physical address and the logical address are not limited to this embodiment.

The image forming apparatus 120 is a complex machine including a printer or the printing function for example. The image forming apparatus 120 is coupled to the communication network 10. The image forming apparatus 120 forms the image represented by the image information transmitted from the information transmission apparatus 111 via the communication network 10.

The configurations of the image forming apparatus 120 are outlined, with reference to FIG. 1B. The image forming apparatus 120 illustrated in FIG. 1B includes a communication unit 121, a user I/F unit 122, a formation unit 123, a storage unit 124, and a controller 125.

The communication unit 121 is configured with a network card for example. The communication unit 121 is coupled to the communication network 10 and the controller 125. The communication unit 121 receives the image information and the print instruction from the information transmission apparatus 111 to which the communication unit 121 is coupled via the communication network 10, and outputs the received information and the received instruction to the controller 125.

The user I/F unit 122 includes an input unit and a display. The input unit is configured with a touch panel or mechanical switches for example, and is coupled to the controller 125. The input unit is operated by the user of the image forming apparatus 120, and inputs various commands to the controller 125. As a concrete example, the input unit inputs the command to form the image that the image data represents. The display is configured with a CRT (Cathode Ray Tube), a liquid crystal panel, or an organic EL (Electro-Luminescence). The display is controlled to display a variety of information by the controller 125. As concrete example, the display is controlled to display the trouble in the image forming apparatus 120 by the controller 125.

The formation unit 123 is configured with IOT (Image Output Terminal) for example. The formation unit 123 forms the image that the image information that the communication unit 121 receives represents. More specifically, the formation unit 123 forms the image by printing the image on the printing medium. The printing medium includes printing papers, fabrics, plastic cards, wooden boards, and iron boards for example.

The storage unit 124 is configured with the storage device such as a hard disk or a semiconductor memory, and is coupled to the controller 125. The storage unit 124 stores the image information received by the communication unit 121 to which the storage unit 124 is coupled via the controller 125. The controller 125 refers to the information stored in the storage unit 124. The controller 125 is configured with a microcomputer for example. The controller 125 controls each unit coupled to the controller 125 by executing the software process.

Figure 2A:
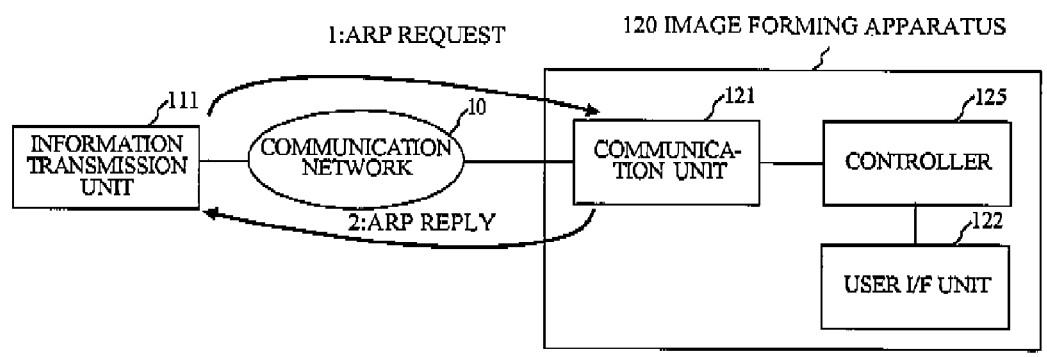
FIGS. 2A and 2B are diagrams explaining an example of the behavior of the image forming apparatus.
Figure 2B:
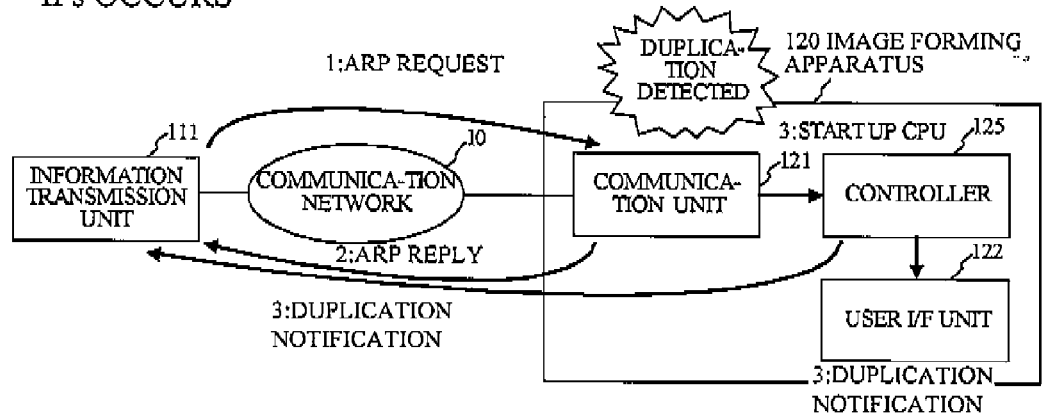

The behavior of the image forming apparatus 120 is outlined, with reference to FIGS. 2A and 2B. FIG. 2A is a diagram illustrating an example of the behavior of the image forming apparatus 120.

The image forming apparatus 120 puts the controller 125 into the sleep mode to reduce the electronic power consumption. The sleep mode means the condition that reduces electronic power consumption by stopping or slowing the operation of the arithmetic device included in the image forming apparatus 120 temporarily (low electric power condition). The image forming apparatus receives the reply request with the communication unit 121. Then, the image forming apparatus 120 determines whether there is the duplication between an identification information that identifies the information transmission apparatus 111 that is the source transmitting the request in the communication network 10 and an identification information that identifies the image forming apparatus 120 that is the destination, with the communication unit 121. The method to determine the identification information and the duplication between the identification information will be described in detail below.

When the image forming apparatus 120 determines that there is not the duplication between the identification information, the image forming apparatus 120 makes the controller 125 continue the sleep mode to return the reply with the communication unit 121.

An example of the behavior of the image forming apparatus 120 when the duplication between the identification information is detected is outlined, with reference to FIG. 2B.

The image forming apparatus 120 return the reply with the communication unit 121 when it determines that there is the duplication between the identification information. Additionally, the image forming apparatus 120 makes the controller 125 return from the low electric power condition. Then the image forming apparatus 120 controls the display included in the user I/F unit 122 to display the duplication between the identification information with the returned controller 125. The image forming apparatus 120 controls the communication unit 121 to transmit the information that indicates the duplication between the identification information with the controller 125. Furthermore, the image forming apparatus 120 changes the identification information, and controls the communication unit 121 to return the changed identification information with the controller 125.

Figure 3A:
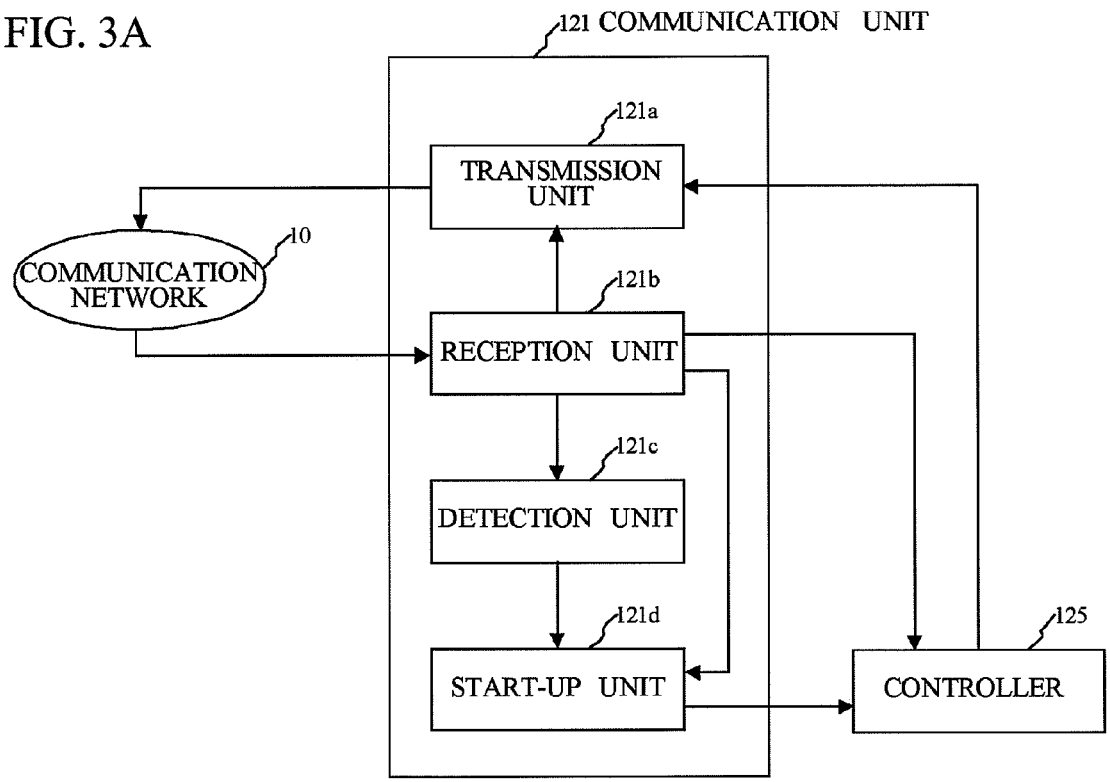
FIGS. 3A and 3B are functional block diagrams illustrating an exemplary configuration of the communication unit.
Figure 3B:
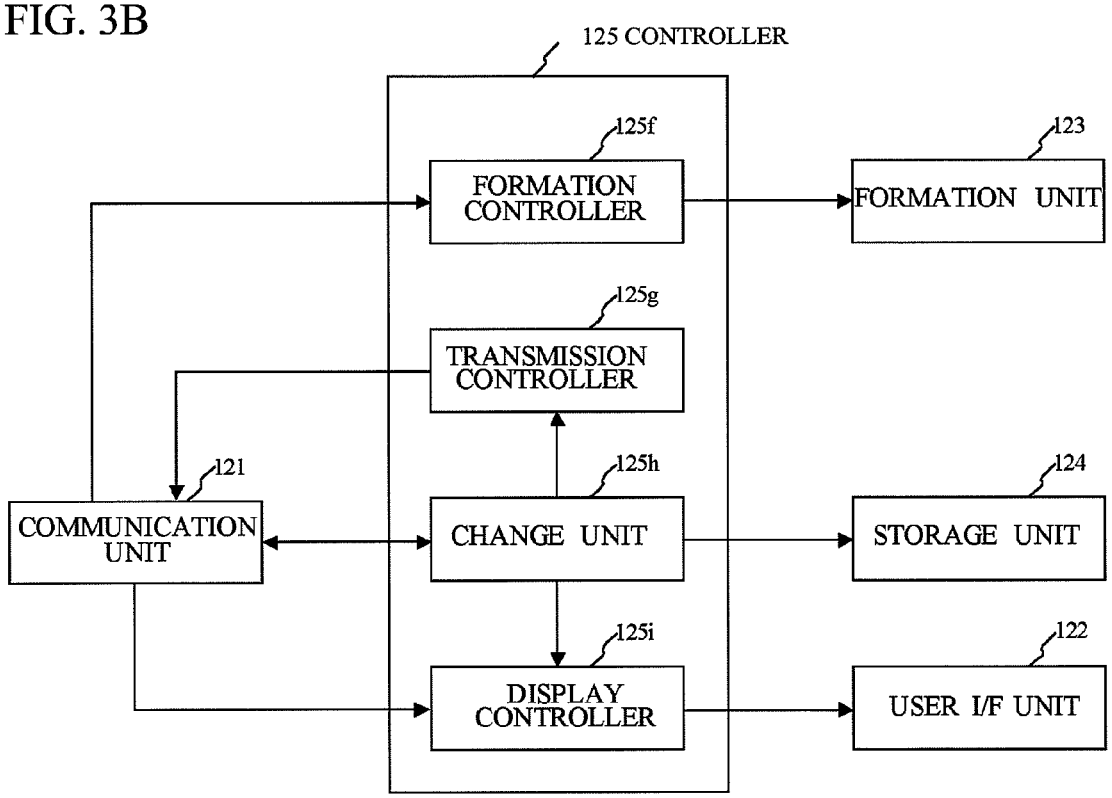

With reference to FIGS. 3A and 3B, the communication unit 121 is described in detail. With reference to FIG. 3A, the communication unit 121 is described in detail.

The communication unit 121 illustrated in FIG. 3A includes a transmission unit 121a, a reception unit 121b, a detection unit 121c, and a start-up unit 121d. The transmission unit 121a, the reception unit 121b, the detection unit 121c, and the start-up unit 121d are configured with electric circuits for example. The transmission unit 121a will be described after.

The reception unit 121b is coupled to the communication network 10, the transmission unit 121a, the detection unit 121c, the start-up unit 121d, and the controller 125. The reception unit 121b receives the reply request, the image information, and the print instruction from the information transmission apparatus 111 to which the reception unit 121b is coupled via the communication network 10. When the reception unit 121b receives the reply request, it outputs the received reply request to the transmission unit 121a and the detection unit 121c. When the controller 125 is in the low electric power condition, the reception unit 121b outputs the reply request to the transmission unit 121a and the detection unit 121c without starting up the controller 125 (without making the controller 125 return from the low electric power condition). Meanwhile, when the reception unit 121b receives the print instruction or the image information, it outputs the instruction to start up the controller 125 to the start-up unit 121d. Then, the reception unit 121b outputs the print instruction and the image information to the started up controller 125.

The detection unit 121c is coupled to the reception unit 121b and the start-up unit 121d. The detection unit 121c detects the duplication between the identification information for identifying the source of the request and the identification information for identifying the destination of the request based on the reply request that the reception unit 121b receives. As a concrete example, the detection unit 121c detects the duplication between the identification information when the logical address of the source detected from the packet representing the request corresponding with the logical address of the destination that the detection unit 121c detects. The detection unit 121c outputs the instruction to start up the controller 125 to the start-up unit 121d when it detects the duplication.

The start-up unit 121d is coupled to the reception unit 121b, the detection unit 121c, and the controller 125. The start-up unit 121d starts up the controller 125 according to the instruction from the reception unit 121b or the detection unit 121c.

The transmission unit 121a is coupled to the communication network 10, the reception unit 121b, and the controller 125. The transmission unit 121a independently returns the reply to the reply request that the reception unit 121b receives, without being controlled by the controller 125. When the controller 125 is in the low electric power condition, the transmission unit 121a returns the reply representing the condition of the image forming apparatus 120 without starting up the controller 125. It is possible for the transmission unit 121a to take the configuration that the transmission unit 121a returns the reply based on the control by the controller 125 when the controller 125 is in the operational state (the controller 125 is not in the low electric power condition). A concrete example of the reply representing the condition of the image forming apparatus 120 can be the ARP reply to the ARP request. ARP reply is the reply returning the physical address of the communication unit 121 to the source. The transmission unit 121a transmits a variety of information to the communication network 10 based on the control by the controller 125. More specifically, when the detection unit 121c detects the duplication between the identification information, the transmission unit 121a is controlled by the controller 125 to return the identification information that the controller 125 changed. More specifically, the transmission unit 121a reports the changed IP address to the information transmission apparatus 111 with the IP address that the controller 125 has changed. Particularly, it is possible for the transmission unit 121a to take the configuration that the transmission unit 121a communicates by using a UDP (User Datagram Protocol) protocol using the unique port set up between the information transmission apparatus 111.

With reference to FIG. 1C, now an example of the hardware configuration that the controller 125 uses for executing the software process is described.

The controller 125 illustrated in FIG. 1C includes an arithmetic device 125a such as CPU (Central Processing Unit), a memory 125b such as a ROM (Read-Only Memory) or RAM (Random Access Memory), and an input-output device 125c such as an AD (Analog-to-Digital) converter. The software process is implemented in that the arithmetic device 125a reads in the program stored in the memory 125b and executes the calculation according to the execution procedure of the software process that the read in program represents. The calculation result of the arithmetic device 125a is written to the memory 125b. As necessary, the input-output device 125c inputs signal inputted from each unit connecting to the controller 125 as the calculation object, and outputs the calculation result to each unit connecting to the controller 125.

With reference to FIG. 3B, the configuration of the controller 125 is described from the functional standpoint. FIG. 3B is a functional block diagram illustrating an example of the configuration of the controller 125.

The controller 125 includes a formation controller 125f, a transmission controller 125g, a change unit 125h, and a display controller 125i.

The formation controller 125f is implemented in the formation control process that the arithmetic device 125a executes. The formation controller 125f is coupled to the communication unit 121 and the formation unit 123. When the formation controller 125f moves toward the low electric power condition, the formation controller 125f controls the formation unit 123 to form the image that the image information that the communication unit 121 receives represents after the communication unit 121 starts up the formation controller 125. When the formation controller 125f is not in the low electric power condition, it controls the formation unit 123 in the operational state.

The transmission controller 125g will be described after.

The change unit 125h is implemented in the change process that the arithmetic device 125a executes. When the communication unit 121 detects the duplication between the identification information, the change unit 125h changes the identification information to another identification information after the communication unit 121 starts up the change unit 125h. More specifically, the change unit 125h controls the communication unit 121 to transmit the request that requests the return of the identification information, which is newly assigned, to the DHCP (Dynamic Host Configuration Protocol) server connecting to the communication network 10 via the communication unit 121. Then the change unit 125h changes, for example, the identification information set in the storage unit 124 and the identification information set in the communication unit 121 to new identification information that the communication unit 121 receives.

In this embodiment, the change unit 125h changes the identification information to the information assigned by the DHCP server, but the information to which the change unit 125h changes the identification information is not limited to this embodiment. For example, it is possible for the change unit 125h to take the configuration that the change unit 125h changes the identification information to the information different from the identification information that the electronic apparatus coupled to the communication network 10 uses based on the identification information detected from the reply request that the communication unit 121 received in past.

The transmission controller 125g is implemented in the communication control process that the arithmetic device 125a executes. The transmission controller 125g is coupled to the communication unit 121 and the change unit 125h. The transmission controller 125g apprises the identification information changed by the change unit 125h, and controls the communication unit 121 to return the change notification to request the change of the identification information of the image forming apparatus 120 registered in the information transmission apparatus 111 to the source of the reply request. The concrete example of the identification information registered in the information transmission apparatus 111 is, for example, the IP address that identifies the image forming apparatus 120 (a printer) registered in the printer driver installed in the information transmission apparatus 111.

The display controller 125*i* is implemented in the display control process that the arithmetic device 125*a* executes. The display controller 125*i* is coupled to the communication unit 121, the user I/F unit 122, and the change unit 125*h*. When the communication unit 121 detects the duplication between the identification information while the display controller 125*i* is in the low electric power condition, the display controller 125*i* controls the display included in the user I/F unit 122 to display the duplication between the identification information after the communication unit 121 starts up the display controller 125*i*. The display controller 125*i* controls the display to display the change of the identification information when the change unit 125*h* changes the identification information. When the display controller 125*i* is not in the low electric power condition, the display controller 125*i* controls the display in the operational state.

Figure 4:
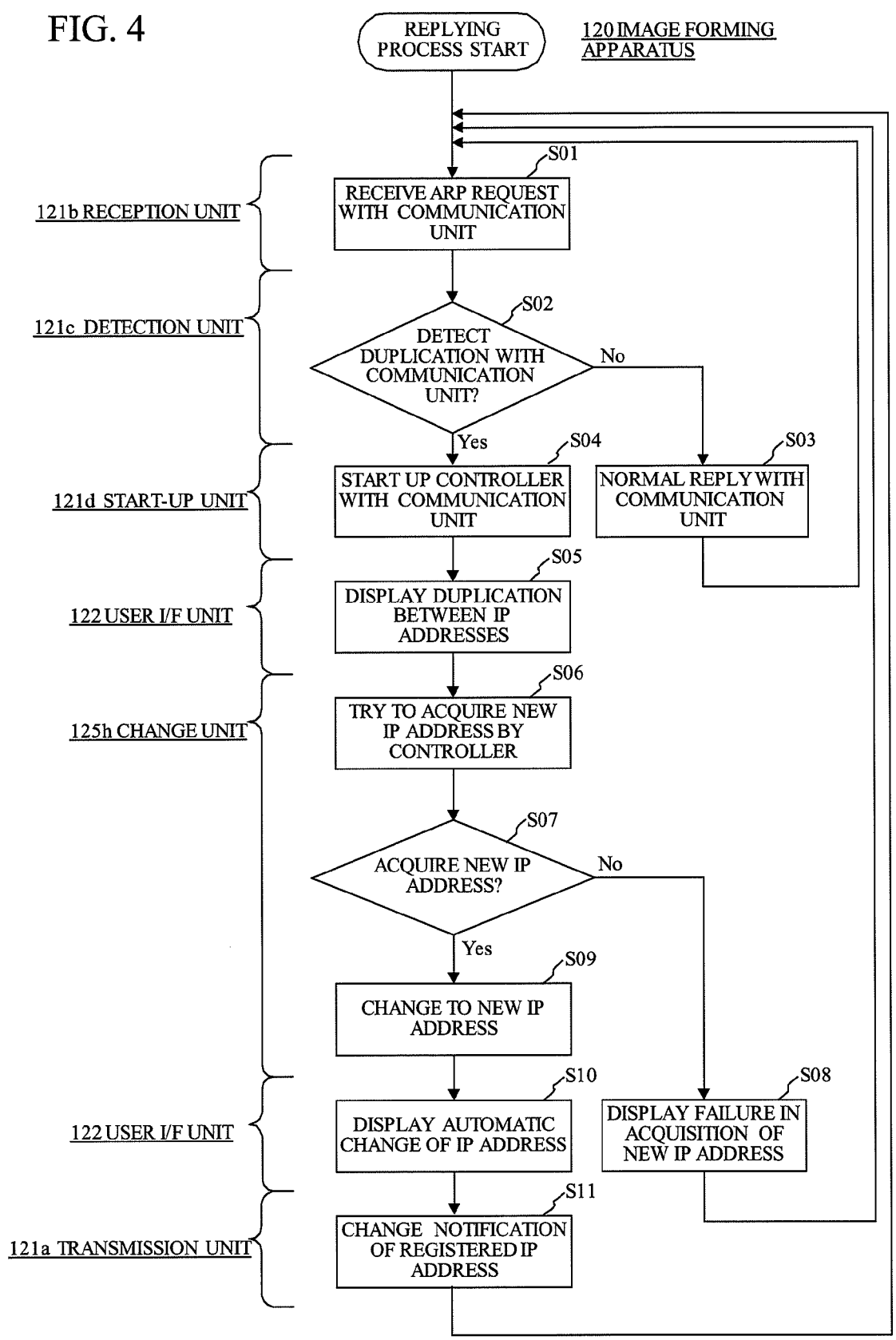
FIG. 4 is a flowchart illustrating a replying process that the image forming apparatus executes.

Now the replying process that the image forming apparatus 120 executes will be described, with reference to FIG. 4. The replying process is the process executed to reply to the request that the information transmission apparatus 111 transmits. FIG. 4 is a flowchart illustrating an example of the replying process that the image forming apparatus 120 executes.

The image forming apparatus 120 receives the ARP request with the communication unit 121 (step S01). Then the image forming apparatus 120 determines whether the duplication between the identification information detected from the ARP request is detected, with the communication unit 121 (step S02). When the image forming apparatus 120 determines that the duplication is detected, the image forming apparatus 120 executes the procedure of the step S04. When the image forming apparatus 120 determines that the duplication is not detected, the image forming apparatus 120 executes the procedure of the step S03.

When the image forming apparatus 120 determines that the duplication is not detected in the step S02, the image forming apparatus 120 executes normal ARP reply (hereinafter, call "normal ARP replay" "normal reply") (step S03). Then the image forming apparatus 120 goes back to the step S01, and repeats the procedures described above.

When the image forming apparatus 120 determines that the duplication is detected in the step S02, the image forming apparatus 120 starts up the controller 125 with the communication unit 121 (step S04). Then the image forming apparatus 120 displays the duplication between the identification information on the display of the user I/F unit 122 (step S05). Then the image forming apparatus 120 tries to acquire new identification information with the controller 125 (step S06). The image forming apparatus 120 determines whether the new identification information is acquired (step S07). When the image forming apparatus 120 determines that the new identification information is acquired, the image forming apparatus 120 executes the procedure of the step S09, if not, the image forming apparatus 120 executes the procedure of the step S08.

When the image forming apparatus 120 determines that the new identification information is not acquired in the step S07, the image forming apparatus 120 displays the notification that the new identification information is not acquired on the display of the user I/F unit 122 (step S08). Then, the image forming apparatus 120 goes back to the step S01 and repeats the procedures above.

When the image forming apparatus 120 determines that the new identification information is acquired in the step S07, the image forming apparatus 120 changes the set identification information to the acquired new identification information (step S09). Then the image forming apparatus 120 displays the notification that the identification information is changed automatically on the display of the user I/F unit 122 (step S10). The image forming apparatus 120 returns the change notification to the source of the reply request with the communication unit 121 (step S11). The image forming apparatus 120 goes back to the step S01, and repeats the procedures above.

In FIG. 4, the procedure of the step S1 corresponds to an example of the procedure that the reception unit 121*b* executes, the procedure of the step S02 corresponds to an example of the procedure that the detection unit 121*c* executes, the procedures of the steps S03 and S11 correspond to examples of the procedures that the transmission unit 121*a* executes, the procedure of the step S04 corresponds to an example of the procedure that the start-up unit 121*d* executes, the procedures of the steps S05, S08 and S10 correspond to examples of the procedures that the user I/F unit 122 executes, and the procedures of the steps S06, S07, and S09 correspond to examples of the procedures that the change unit 125*h* executes.

Figure 5:
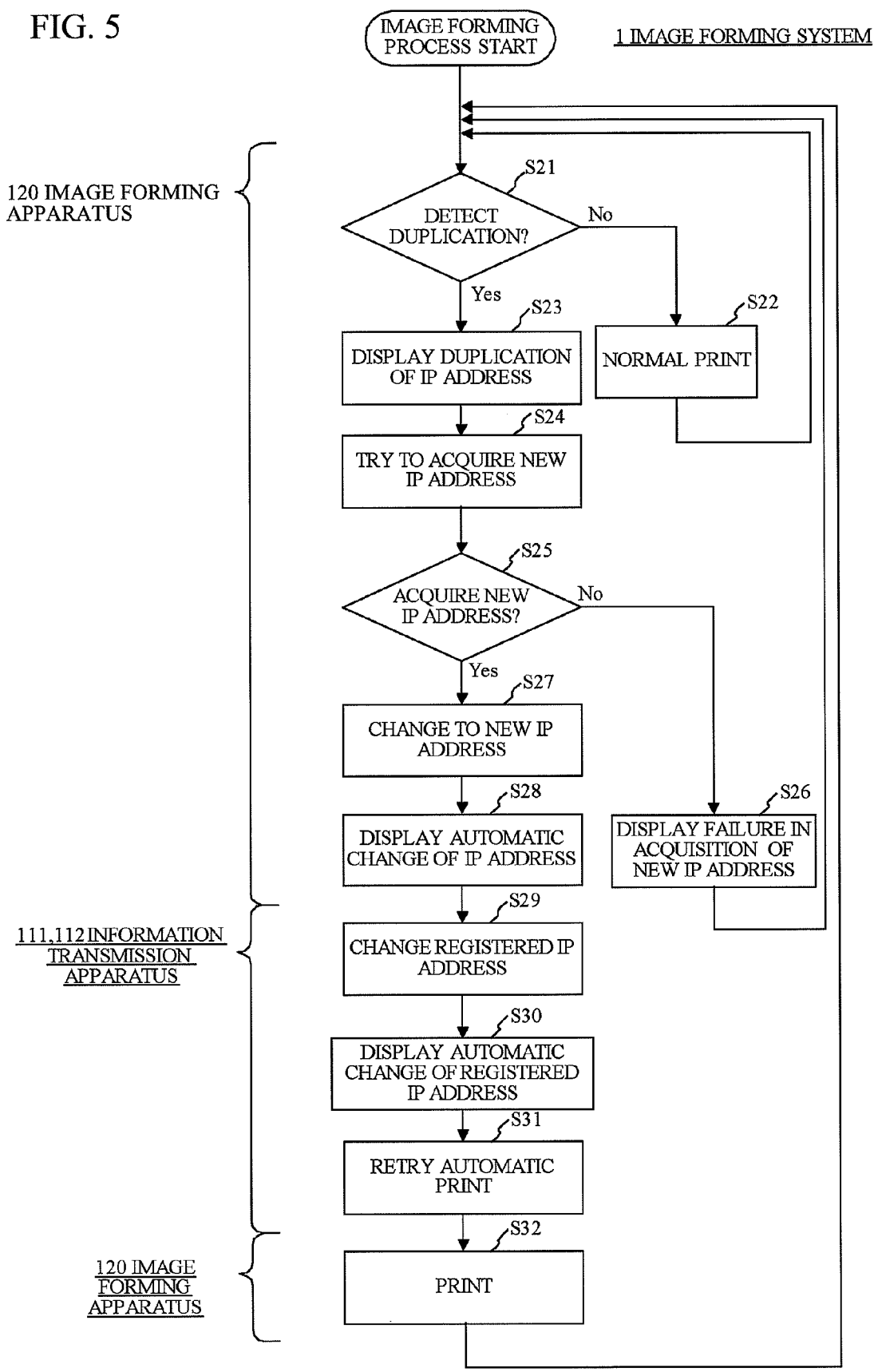
FIG. 5 is a flowchart illustrating an image forming process that the image forming system executes.

Now the image forming process that the image forming system 1 executes to form the image will be described with reference to FIG. 5. FIG. 5 is a flowchart illustrating an example of the image forming process that the image forming system 1 executes.

The image forming system 1 transmits the reply request before transmitting the print request and the print instruction to the image forming apparatus 120 from the information transmission apparatus 111. Then the image forming system 1 detects the duplication between the identification information based on the reply request of the identification information with the image forming apparatus 120, and determines whether the duplication is detected (step S21). When the duplication is detected with the image forming apparatus 120, the image forming system 1 executes the procedure of the step S22, if not, it executes the procedure of the step S23.

When the image forming system 1 determines that the duplication is detected in the step S21, it forms the image information that the information transmission apparatus 111 transmits, with the image forming apparatus 120 (hereinafter, call this "normal print") (step S22). Then the image forming system 1 goes back to the step S21, and repeats the procedures above.

When the image forming system 1 determines that the duplication is detected in the step S21, the image forming system 1 displays the duplication between the identification information with the image forming apparatus 120 (step S23). Then the image forming system 1 executes the procedures from the steps S24 to S28 with the image forming apparatus 120 (steps S24 to S28). Because the procedures from the steps S24 to S28 are same as the procedures from the steps S06 to S10, the description of these procedures is skipped.

After executing the step S28, the image forming system 1 changes the registered identification information that identifies the image forming apparatus 120 to the identification information that the image forming apparatus 120 changes, with the information transmission apparatus 111 (step S29). More specifically, the information transmission apparatus 111 receives the change notification from the image forming apparatus 120, and changes the registered identification information to the identification information that the received change notification apprises. Then the image forming system 1 displays the notification that the registered identification information that identifies the image forming apparatus 120 is changed, with the information transmission apparatus 111 (step S30). The image forming system 1 transmits the print instruction and the image information to the image forming apparatus 120 with the new identification information, with the information transmission apparatus 111 (step S31). Then, the image forming system 1 prints the image that the image information represents, according to the received print instruction, with the image forming apparatus 120 (step S32). Then the image forming system 1 goes back to the step S21 and repeats the procedures above.

In this embodiment, the communication unit 121 corresponds to an example of a communication device of the present invention. The transmission unit 121a corresponds to an example of a transmission unit, the reception unit 121b corresponds to an example of a reception unit that the communication device includes, and the detection unit 121c corresponds to an example of a detection unit.

Additionally, the communication unit 121 corresponds to an example of a communication unit that an image forming apparatus includes, the display that the user IF unit 122 includes corresponds to an example of a display, the formation unit 123 corresponds to an example of a formation unit, and the controller 125 corresponds to an example of a controller.

Second Embodiment

In this embodiment, a description will be given of an image forming apparatus that displays the duplication between the information without starting up a controller when the image forming apparatus detects the duplication between the identification information.

Figure 6A:
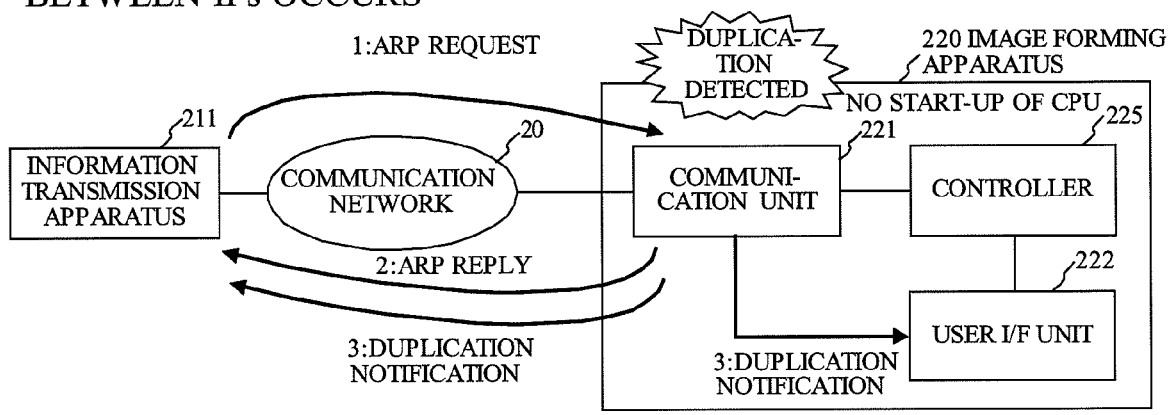
FIGS. 6A and 6B are diagrams explaining an example of the behavior of the image forming apparatus in accordance with the second embodiment.
Figure 6B:
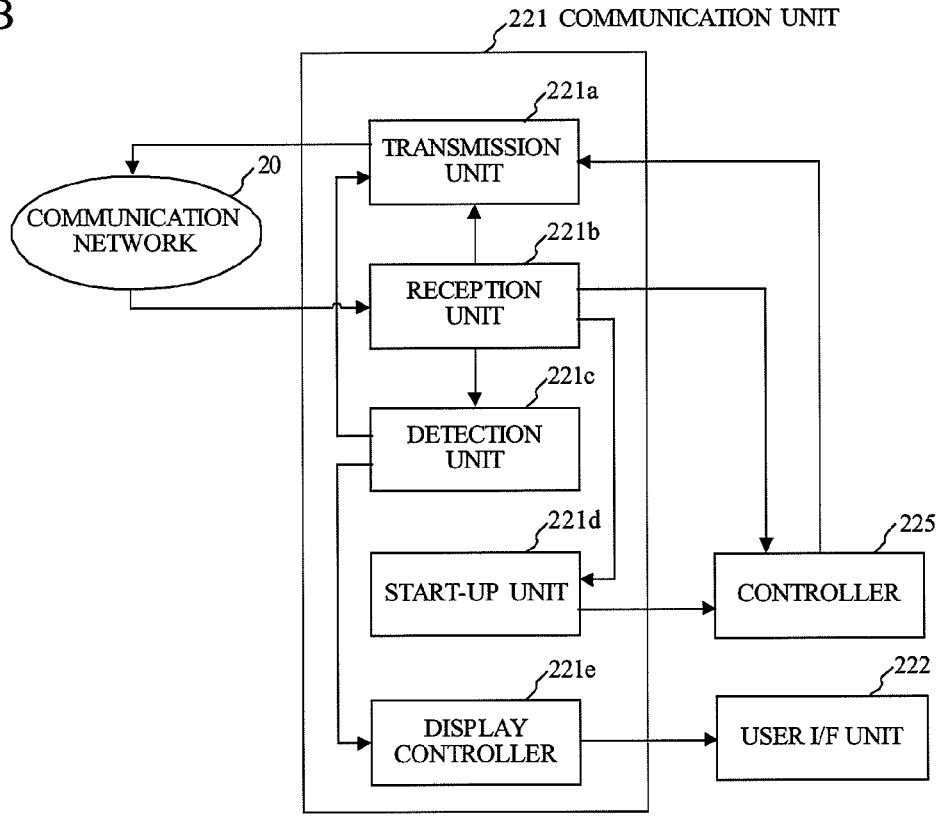

A behavior of the image forming apparatus in accordance with the second embodiment is outlined with reference to FIGS. 6A and 6B. FIG. 6A is a diagram outlining an example of the behavior of the image forming apparatus in accordance with the second embodiment. An image forming apparatus 220 illustrated in FIG. 6A includes a communication unit 221 and a user I/F unit 222, a formation unit 223 and a storage unit 224, and a controller 225. Because the communication unit 221 through the controller 225 are same as the communication unit 121 through the controller 125 described in the first embodiment respectively, the description will be given of the difference between the first and second embodiment mainly. As with the image forming apparatus 120 described in the first embodiment, the image forming apparatus 220 illustrated in FIG. 6A is one component of an image forming system 2 that includes a communication network 20 and information transmission apparatuses 211 and 212. The communication network 20 and the information transmission apparatuses 211 and 212 are the same as the communication network 10 and the information transmission apparatuses 111 and 112 described in the first embodiment.

The image forming apparatus 220 puts the controller 225 into the sleep mode. The image forming apparatus 220 receives a reply request with the communication unit 221. Then the image forming apparatus 220 determines whether there is a duplication between the identification information that identifies the information transmission apparatus 211 and the identification information that identifies the image forming apparatus 220, with the communication unit 221.

When the image forming apparatus 220 determines that there is a duplication between the identification information, it returns a reply with the communication unit 221. The image forming apparatus 220 controls the display of the user I/F unit 222 to display the duplication between the identification information and returns the duplication notification that notifies the duplication between the identification information to the source of the request, without making the controller 225 return from the low electric power condition.

The configuration of the communication unit 221 in accordance with the second embodiment is described with reference to the FIG. 6B. FIG. 6B is a diagram illustrating an example of the configuration of the communication unit 221 in accordance with the second embodiment.

The communication unit 221 includes a transmission unit 221a, a reception unit 221b, a detection unit 221c, and a start-up unit 221d as with the first embodiment, and further includes a display controller 221e.

The transmission unit 221a is also coupled to the detection unit 221c. When the detection unit 221c detects the duplication between the identification information, the transmission unit 221a returns the duplication notification to the source of the reply request with the communication method without the duplicating identification information. More specifically, the transmission unit 221a gives the notification about the duplication between the IP addresses by using the packet using the unique type of Ethernet, which is the communication protocol except the IP (Internet Protocol) that uses the IP address.

The detection unit 221c is also coupled to the transmission unit 221a and the display controller 221e, and is not coupled to the start-up unit 221d. When the detection unit 221c detects the duplication between the identification information, it outputs the instruction that instructs the transmission unit 221a to transmit the notification of the duplication between the identification information to the transmission unit 221a. When the detection unit 221c detects the duplication between the identification information, it outputs the instruction that instructs the display controller 221e to control the display of the user I/F unit 222 to display the duplication between the identification information to the display controller 221e.

The start-up unit 221d is not coupled to the detection unit 221c. Therefore, the start-up unit 221d does not start up the controller 225 even when the detection unit 221c detects the duplication.

The display controller 221e is configured with an electric circuit for example. The display controller 221e is coupled to the detection unit 221c. When the detection unit 221c detects the duplication, the display controller 221e controls the display of the user I/F unit 222 to display the duplication between the identification information.

Third Embodiment

In this embodiment, a description will be given about an image forming apparatus that saves a log that records the duplication without starting up the controller when the duplication between the identification information is detected.

Figure 7:
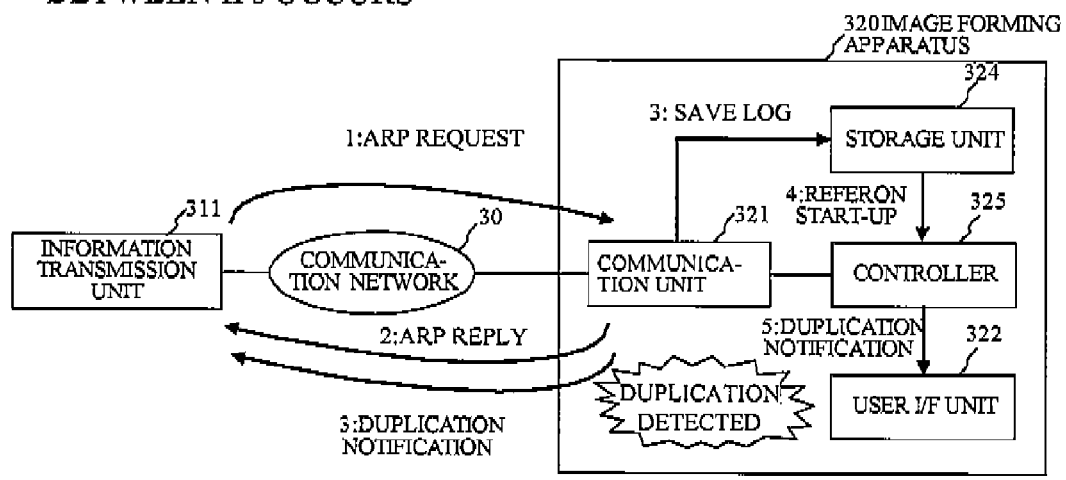
FIG. 7 is a diagram explaining an example of the behavior of the image forming apparatus in accordance with the third embodiment.

The behavior of the image forming apparatus in accordance with the third embodiment is outlined with reference to FIG. 7. FIG. 7 is a diagram outlining an example of the behavior of the image forming apparatus in accordance with the third embodiment.

As with the first embodiment, an image forming apparatus 320 illustrated in FIG. 7 includes a communication unit 321 and a user I/F unit 322, a formation unit 323, and a storage unit 324 and a controller 325. Because the communication unit 321 through the controller 325 are same as the communication unit 121 through the controller 125 described in the first embodiment respectively, the description will be given about the difference between the first and third embodiments mainly. As with the image forming apparatus 120 described in the first embodiment, the image forming apparatus 320 illustrated in FIG. 7 is one component of an image forming system 3 that includes a communication network 30 and information transmission apparatuses 311 and 312. The communication network 30 and the information transmission apparatuses 311 and 312 are same as the communication network 10 and the information transmission apparatuses 111 and 112 described in the first embodiment.

The image forming apparatus 320 puts the controller 325 into a sleep mode. Then the image forming apparatus 320 receives the reply request with the communication unit 321. The image forming apparatus 320 determines whether there is a duplication between the identification information that identifies the information transmission apparatus 311 and the identification information that identifies the image forming apparatus 320, with the communication unit 321.

When the image forming apparatus 320 determines that there is a duplication between the identification information, it returns the reply, and returns the duplication notification that gives a notification of the duplication between the identification information to the source of the request, with the communication unit 321. Additionally, the image forming apparatus 320 saves the detection information that represents the detection of the duplication between the identification information into the storage unit 324 without making the controller 325 return from the low electric power condition. Then the image forming apparatus 320 determines whether the storage unit 324 stores the detection information when it starts up the controller 325 to print the image because it received the print instruction for example. When the image forming apparatus 320 determines that the storage unit 324 stores the detection information, the image forming apparatus 320 displays the detection of the duplication between the identification information, before, during, or after the printing.

Figure 8A:
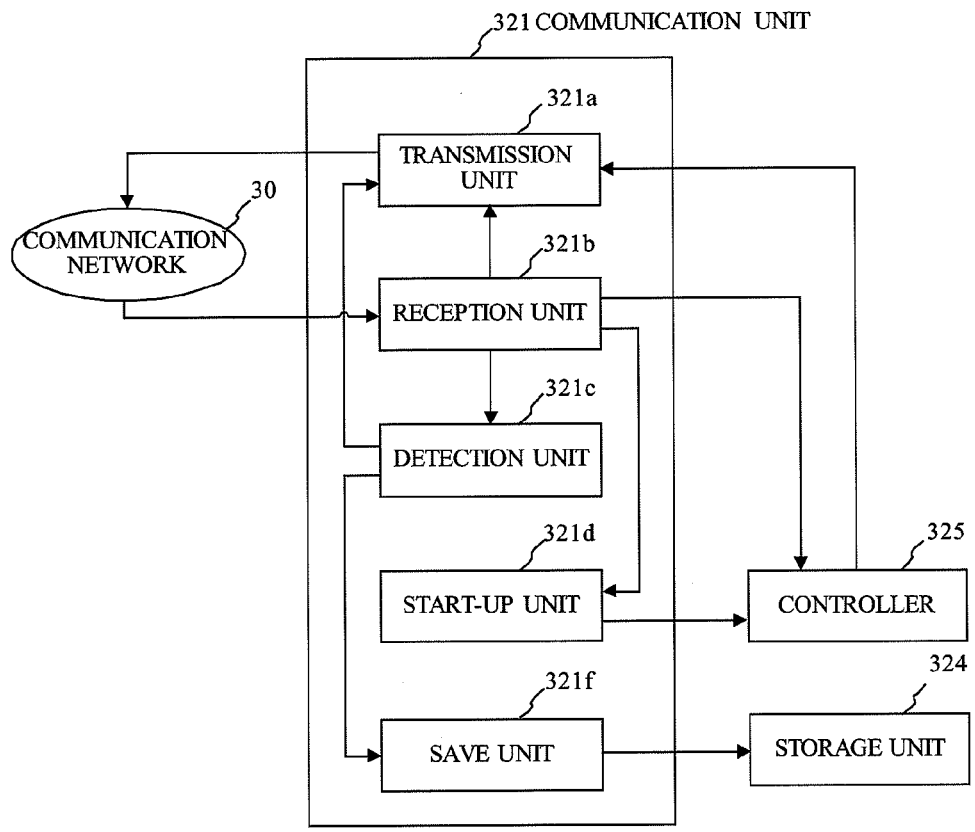
FIGS. 8A and 8B are functional block diagrams illustrating an exemplary configuration of the communication unit in accordance with the third embodiment.

The configuration of the communication unit 321 in accordance with the third embodiment will be described with reference to FIGS. 8A and 8B. FIG. 8A is a diagram illustrating an example of the configuration of the communication unit 321 in accordance with the third embodiment.

The communication unit 321 illustrated in FIG. 8A includes a transmission unit 321a, a reception unit 321b, a detection unit 321c, and a start-up unit 321d as with the first embodiment, and further includes a save unit 321f. The transmission unit 321a through the start-up unit 321d are same as the transmission unit 221a through the start-up unit 221d of the second embodiment.

The save unit 321f is configured with an electric circuit for example. The save unit 321f is coupled to the detection unit 321c and the storage unit 324. When the detection unit 321c detects the duplication, the save unit 321f saves the detection information that represents the detection of the identification information into the storage unit 324. The storage unit 324 stores the information representing the behavior of the communication unit 321. More specifically, the storage unit 324 stores the log that represents communication records of the communication unit 321, and the log that represents the detection record that is the record of the detection of the identification information by the communication unit 321.

The configuration of the controller 325 in accordance with the third embodiment will be described with reference to the FIG. 8B.

Figure 8B:
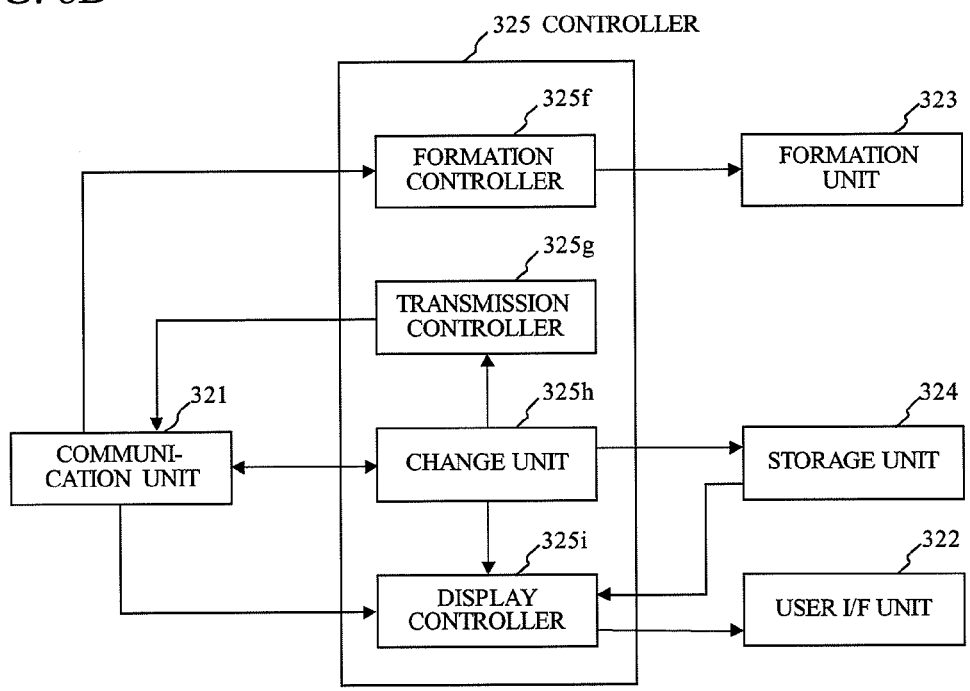

The controller 325 illustrated in FIG. 8B includes a formation controller 325f, a transmission controller 325g, a change unit 325h, and a display controller 325i as with the first embodiment. Because the formation controller 325f through the display controller 325i are same as the formation controller 125f through the display controller 125i of the first embodiment, the description will be given about the difference between the first and third embodiments mainly.

The display controller 325i is also coupled to the storage unit 324. The display controller 325i determines whether the storage unit 324 stores the detection information when it starts and returns from the low electric power condition. When the display controller 325i determines that the storage unit 324 stores the detection information, it controls the display of the user I/F unit 322 to display the duplication between the identification information.

A part of or all of functions that the image forming apparatuses 120, 220, and 320 implement with the execution of the software process can be implemented with the hardware circuit. A part of or all of functions that the image forming apparatuses 120, 220, and 320 implement with the hardware can be implemented with the execution of the software process.

A part of or all of functions that the communication units 121, 221, and 321 implement with the hardware circuit can be implemented with the execution of the software process.

The program describing the process that the image forming apparatuses 120, 220, and 320, and the communication units 121, 221, and 321 execute can be supplied by providing a magnetic disk, an optical disk, a semiconductor memory, or other recording media to which the program is stored, or delivering the program via the network.

It should be noted that the present invention is not limited to those exemplary embodiments, and various modifications may be made to them without departing from the scope of the invention.

What is claimed is:

1. An image forming apparatus comprising:
   a communication unit that receives a request that includes a source of the request and a destination of the request; and
   a controller that moves into and returns from a low electric power condition of which the power consumption of the controller is low, and that controls the communication unit,
   wherein when the controller is in the low electric power condition, the communication unit returns a reply to the request and detects a duplication between identification information that identifies the source and identification information that identifies the destination based on the request,
   the controller returns from the low electric power condition and changes the identification information to another identification information when the communication unit detects the duplication between the identification information,
   the communication unit returns the identification information, which the controller changes, to the source, and
   a failure in acquisition of the another identification information is displayed when the another identification information is not acquired.

2. The image forming apparatus according to claim 1, wherein
   the identification information which the controller changes is information newly assigned by a DHCP server.

3. The image forming apparatus according to claim 1 further comprising a display,
   wherein the communication unit controls the display to display the duplication between the identification information when the communication unit detects the duplication between the identification information.

4. The image forming apparatus according to claim 1 further comprising:
   a display; and
   a storage unit,
   wherein the communication unit stores detection information that represents a detection of the duplication between the identification information into the storage unit when the duplication between the identification information is detected, and the controller controls the display to display a notice of the duplication according to the detection information stored in the storage unit when the controller returns from the low electric power condition.

5. The image forming apparatus according to claim 3, wherein the communication unit transmits information that represents the duplication to the source when the communication unit detects the duplication between the identification information.

6. The image forming apparatus according to claim 4, wherein the communication unit transmits information that represents the duplication to the source when the communication unit detects the duplication between the identification information.

\* \* \* \* \*